US012754371B2

(12) United States Patent
Ottermann et al.

(10) Patent No.: US 12,754,371 B2
(45) Date of Patent: Oct. 6, 2026

(54) SUBSTRATE AND METHOD FOR MODIFYING AT LEAST ONE REGION OF A SURFACE OR A PORTION OF A SUBSTRATE

(71) Applicant: Schott AG, Mainz (DE)

(72) Inventors: Clemens Ottermann, Hattersheim (DE); Frederick Bachhuber, Mainz (DE); Stefan Weidlich, Mainz-Kastel (DE)

(73) Assignee: SCHOTT AG, Mainz (DE)

( * ) Notice: Subject to any disclaimer, the term of this patent is extended or adjusted under 35 U.S.C. 154(b) by 805 days.

(21) Appl. No.: 17/957,913

(22) Filed: Sep. 30, 2022

(65) Prior Publication Data

US 2023/0102394 A1 Mar. 30, 2023

(30) Foreign Application Priority Data

Sep. 30, 2021 (DE) ..................... 10 2021 125 476.0

(51) Int. Cl.

| | |
|---|---|
| ***G02B 6/134*** | (2006.01) |
| ***F21V 8/00*** | (2006.01) |
| ***G02B 26/08*** | (2006.01) |
| ***G02B 27/01*** | (2006.01) |

(52) U.S. Cl.

CPC ......... *G02B 6/1347* (2013.01); *G02B 6/0046* (2013.01); *G02B 26/0891* (2013.01); *G02B 27/0172* (2013.01)

(58) Field of Classification Search

CPC .... G02B 6/1347; G02B 6/0046; G02B 6/136; G02B 6/1223; G02B 26/0891; G02B 27/0172; G02B 5/00; G02B 2006/12038

USPC .......................................................... 359/619

See application file for complete search history.

(56) References Cited

U.S. PATENT DOCUMENTS

| | | | | |
|---|---|---|---|---|
| 3,548,189 | A | 12/1970 | Meinel et al. | |
| 2002/0179576 | A1 | 12/2002 | Takeuchi et al. | |
| 2006/0185582 | A1 * | 8/2006 | Atwater, Jr. ............ | C30B 33/06 257/E31.022 |
| 2007/0125747 | A1 * | 6/2007 | Otsuka .................... | C03C 15/02 430/4 |

(Continued)

FOREIGN PATENT DOCUMENTS

| | | |
|---|---|---|
| DE | 10 2006 013 599 A1 | 9/2007 |
| DE | 10 2006 027 958 A1 | 12/2007 |

(Continued)

OTHER PUBLICATIONS

"Glass and glass-ceramics—Knoop hardness test", International Standard ISO 9385, May 1, 1990 (8 pages).

*Primary Examiner* — Travis S Fissel

(74) *Attorney, Agent, or Firm* — TAYLOR & EDELSTEIN, PC

(57) ABSTRACT

A method for physically modifying at least one of at least one region of a surface of a substrate and at least one portion of the substrate, the substrate comprising a multicomponent glass, the method comprising the steps of: providing an apparatus and the substrate, the apparatus including a radiation source configured for generating a particle beam; feeding the substrate to the apparatus and applying a vacuum; modifying at least one of the at least one region of the surface of the substrate and the at least one portion of the substrate by an exposure to the particle beam.

24 Claims, 2 Drawing Sheets

(56) References Cited

U.S. PATENT DOCUMENTS

| | | | | |
|---|---|---|---|---|
| 2012/0067843 | A1* | 3/2012 | Watanabe | G03F 7/165 216/22 |
| 2013/0192305 | A1* | 8/2013 | Black | C03B 33/0222 65/30.14 |
| 2017/0345699 | A1* | 11/2017 | Katayama | B32B 17/06 |
| 2018/0052501 | A1* | 2/2018 | Jones, Jr. | G02B 6/0016 |
| 2019/0193198 | A1* | 6/2019 | Blair | B23K 26/3576 |
| 2021/0255387 | A1 | 8/2021 | Bhargava et al. | |

FOREIGN PATENT DOCUMENTS

| | | | |
|---|---|---|---|
| DE | 10 2009 010 701 | A1 | 9/2010 |
| DE | 10 2009 055 987 | A1 | 6/2011 |
| DE | 10 2013 225 061 | A1 | 6/2015 |
| DE | 10 2018 111 144 | A1 | 11/2018 |
| DE | 10 2018 004 452 | A1 | 12/2018 |
| DE | 10 2021 110 497 | A1 | 11/2021 |
| DE | 10 2020 120 171 | A1 | 2/2022 |
| EP | 1 437 215 | A1 | 7/2004 |
| EP | 2 246 317 | A1 | 11/2010 |
| WO | 2015/124710 | A1 | 8/2015 |

* cited by examiner

SUBSTRATE AND METHOD FOR MODIFYING AT LEAST ONE REGION OF A SURFACE OR A PORTION OF A SUBSTRATE

CROSS REFERENCE TO RELATED APPLICATIONS

This claims priority to German patent application no. 10 2021 125 476.0, filed Sep. 30, 2021, which is incorporated herein by reference.

BACKGROUND OF THE INVENTION

1. Field of the Invention

The present invention relates to a method for modifying at least one region of a surface or one portion of a substrate and also to a substrate modified accordingly. The substrate concerned may be a wafer, more particularly a wafer including a transparent multicomponent glass of high refractive index. The substrate regions modified in accordance with the present invention may be used, directly or after singulation of a wafer, for example, for imaging optical systems, for instance in the field of augmented reality (AR).

2. Description of the Related Art

Imaging optical systems fulfill a central function in the field of augmented reality (AR). In contrast to virtual reality, where a user is located entirely within a virtual space, augmented reality provides the user with additional information in visual form. Augmented reality is focused accordingly on a close integration of additional imagewise information into real, visual perceptions.

Imaging optical systems in the field of augmented reality may, for example, be wearable, head-mounted systems, with which a user is presented additionally with an image in his or her field of view. There are a multitude of ways in which the user can be displayed additional information through the additional image, in order, for instance, in medicine to present a surgeon with a display of non-visible elements which have been recorded beforehand by way of tomography, for example. Other applications relate to navigation, in an aircraft or else in vehicles, for example. Diffractive or refractive optical elements may be employed in these contexts.

Imaging optical systems of these kinds may have an ocular for visualization to the user of images projected onto said ocular. The oculars may include very thin optical glasses, optionally of high refractive index, or may include a laminate including such very thin, high-index optical glasses.

The surfaces or layers in these cases may also be patterned and provided, for example, with a light-diffracting nanostructure or a grating. There may also be two or more layers with different patterns or gratings in order to provide the user with specific optical information, such as to present them with information in three dimensions.

The thin, high-index optical glasses are subjected to very stringent requirements, in terms of planarity and flatness, for example, since even very slight deviations, in the thickness, for instance, can lead to unintended variations or distortions in the image displayed and hence may possibly render the displayed information unusable.

The thin, high-index optical glasses here are generally melted from suitable raw materials in a glass-melting facility and cast into bars or blocks of optical glass. The substrates may be separated off or cut out from such bars or blocks, before being worked in accordance with the respective specifications.

This working generally sees the individual substrates subjected to grinding or, in particular, fine polishing in costly and complicated procedures which often take a number of hours.

Fine polishing, as disclosed for instance in specification DE 10 2018 004 452 A1, is typically a chemical-mechanical process, employing polishing pads and also a polishing solution or slurry.

The process parameters for the fine working are laid down on the basis of preliminary tests. In production itself, the substrates are then produced with set specifications.

In order to be able to meet the very stringent requirements relating, for example, to the flatness and planarity of the singulated substrates, the substrates are typically measured individually. Suitable measurement methods may be utilized for this purpose, on the basis, for instance, of interferometry.

A subsequent actual/target comparison between the measured results and the specification then indicates whether the specifications are being observed or whether reworking may still be possible or necessary, or whether the processed substrates must be discarded because they are outside the specification.

This type of production has a number of disadvantages.

First it may be necessary to measure the flatness and planarity again after a polishing step, since the ablation and the polishing quality may be different at different regions of the substrate. For example, because of the rotational movements during polishing, the margins of the substrate may have undergone greater ablation than middle regions, and this may be fairly unfavorable. It may lead, for example, to substantial deviations in the parallelism of the surfaces, and this may be detrimental to the modulation transfer function. As a result, the image sharpness may be poorer or different.

It may be necessary, moreover, for the substrate to be removed from the polishing mount for measurement. After the fine working, however, because of the polishing, the substrates are frequently very heavily soiled, and so first of all a complicated cleaning is necessary, and this is time-consuming. If reworking becomes necessary, however, replacing the substrate in the mount may lead to a different polishing pattern, which may likewise be unwanted. Given that frequently a plurality of substrates are treated in the polishing machines at the same time, it may be necessary, for a subsequent treatment, to collect together a plurality of wafers, as far as possible of the same kind, and subject them to joint processing.

Ultimately this may result in particular regions of the substrate being outside of specification—for example, no longer complying with a minimum thickness requirement—meaning that the entire substrate must be discarded if these regions relate to the utility regions of the substrate. Given that compliance with the specification can only be tested after the individual polishing steps, it is correspondingly unfavorable to have to discard substrates which have undergone fine polishing.

Utility regions may, for example, constitute certain regions of a substrate or wafer which have been separated off from the substrate. US 2021/0255387 A1, for example, describes a substrate from which a total of four such portions or regions have been separated off, which can be used as eyepieces for oculars in the field of augmented reality. These regions of the substrate may be subject to very specific requirements in terms, for example, of planarity and flatness.

A further disadvantage of the existing production methods can be seen in the fact that polishing may be accompanied by chemical alterations to the surfaces of the substrate, the surfaces being in close contact with the polishing agents for a certain period of time. One commonly used polishing agent, especially in connection with the fine working of glass materials, includes cerium dioxide. In the course of polishing, this compound may accumulate in the near-surface marginal regions of the substrate, and the original surface properties of the substrate may be altered as a result.

This constitutes a further disadvantage, since it may entail an alteration to the refractive index in the near-surface regions, which may prove unfavorable for the optical quality of the substrate.

As well as these chemical alterations to the surface of the substrate, the polishing may also generate or give rise to surface structures which are relatively undesirable. Examples of these may be grooves having a depth in the nanometer range or below, which may also be randomly distributed and/or present with a directed structure. This as well may adversely affect optical properties of the substrate.

Desirable accordingly is a method for producing a substrate that does not have these disadvantages.

What is needed in the art is as far as possible to retain unaltered the original chemical surface properties of the substrate, even in the case of working, such as of precision polishing.

What is also needed in the art is to work not only the complete surface of the substrate in order, for instance, to eliminate any unwanted fluctuation in thickness, but also only a region of a surface of the substrate.

What is also needed in the art is that the working is to take place extremely rapidly and simply, as far as possible with optionally no interruption to the working, in order, for instance, to perform renewed measurement on the substrate.

SUMMARY OF THE INVENTION

The present invention provides, in a first aspect of the present invention, a method for optionally physically modifying at least one region of a surface and/or one portion of a substrate, the substrate including a multicomponent glass, and where at least the following steps are included:

- providing an apparatus having a radiation source for generating a particle beam;
- providing a substrate;
- feeding the substrate to the apparatus and applying a vacuum;
- modifying the region of the surface and/or the portion of the substrate by exposure to the particle beam.

The apparatus for generating a particle beam here may include an ion source or an ion canon as radiation source, which may serve to generate ions, optionally positively charged ions, argon for example. A focused ion beam can be directed in operation onto a substrate mounted in the apparatus, optionally under reduced pressure. The ions here may be accelerated. When the ions impinge on the surface of the substrate to be worked, there is a transfer of impulse from them to the substrate, and material can be atomized from the surface by exposure to the particle beam and can be ablated.

Processes of these kinds are also known as ion thinning or ion-beam etching.

The particle beam may be guided over a region or portion of the substrate by way of corresponding deflection units, in order to modify that region or portion accordingly. The deflection units are optionally equipped such that any desired point on the substrate can be reached. The apparatus may include suitable computer-assisted devices for controlling the particle beam, allowing the particle beam to be guided over the substrate according to mandatable programs or parameters. This may also take place more than once, in order to ablate more material, for instance. The controlling of the particle beam here may relate not only to the guiding of the particle beam over the substrate, but also, instead, to the setting of performance parameters of the particle beam, examples being the intensity, the duration, the focusing, or the angle at which the particle beam impinges on the substrate at the corresponding point.

In one particularly optional embodiment, the substrate here includes a multicomponent glass. This means that the substrate includes at least oxides of at least two different cations.

In a first, optional embodiment, the multicomponent glass is an optical glass. Optical glass in the sense of the invention refers to glasses suitable for optical applications, especially optical crown glasses and flint glasses. These may be selected from the group encompassing silicon-, boron-, aluminum-, phosphorus-, fluorine-, lanthanum-, titanium-, barium- and/or niobium-containing crown or flint glasses.

A glass according to the present invention is not confined to particular glass compositions. Suitable embodiments and compositions are apparent from the examples given below.

$SiO_2$ is a glass former. The oxide makes a great contribution to the chemical resistance, but also increases the processing temperatures. If used in very large amounts, the refractive indices of the invention cannot be achieved. The optical glass may optionally include 0 to 80 wt %, for example at most 70 wt %, at most 60 wt % or at most 15 wt %, of $SiO_2$. In certain embodiments the glass includes at least 10 wt %, at least 20 wt %, at least 30 wt % or at least 40 wt % of $SiO_2$. In other embodiments the optical glass includes less than 20 wt % or even less than 10 wt % of $SiO_2$.

The optical glass may optionally include 0 to 40 wt %, for example at most 30 wt %, at most 5 wt % or at most 2 wt %, of $P_2O_5$. In certain embodiments the optical glass includes at least 10 wt %, at least 15 wt % or at least 20 wt % of $P_2O_5$. In other embodiments the optical glass includes at most 1 wt %, or at most 0.5 wt % of $P_2O_5$. In certain embodiments the optical glass may be free from $P_2O_5$.

The optical glass may optionally include 0 to 25 wt %, for example at most 15 wt %, at most 10 wt %, or at most 5 wt % of $Al_2O_3$. In certain embodiments the optical glass includes at least 0.1 wt %, at least 0.5 wt % or at least 1 wt % of $Al_2O_3$. In certain embodiments the optical glass includes at most 1 wt % or at most 0.5 wt % of $Al_2O_3$. In certain embodiments the optical glass is free from $Al_2O_3$.

$B_2O_3$ has emerged as being particularly suitable for achieving low melting temperatures. On account in particular of its aggressiveness toward melting-tank materials, however, the amount of $B_2O_3$ is limited. The optical glass may optionally include 0 to 55 wt %, for example at most 45 wt %, at most 35 wt %, or at most 25 wt % of $B_2O_3$. In certain embodiments the optical glass includes at least 1 wt %, at least 2 wt %, or at least 5 wt % of $B_2O_3$. In certain embodiments the optical glass includes 20 wt %, at most 15 wt % or at most 10 wt % of $B_2O_3$. In certain embodiments the optical glass may also be free from $B_2O_3$.

The optical glass may optionally include 0 to 10 wt %, for example at most 5 wt %, at most 2 wt %, or at most 1 wt % of $Li_2O$. In certain embodiments the optical glass includes at least 0.5 wt %, at least 1 wt %, or at least 2 wt % of $Li_2O$. In other embodiments the optical glass includes at most 0.5 wt %, at most 0.2 wt % or at most 0.1 wt % of $Li_2O$. $Li_2O$ is known to be aggressive toward ceramic tank and crucible materials and is therefore used ideally not at all or only in small amounts. Optionally, therefore, the glass is free from $Li_2O$.

The optical glass optionally includes 0 to 30 wt %, for example at most 25 wt %, at most 20 wt %, at most 10 wt %, or at most 5 wt % of $Na_2O$. In certain embodiments the optical glass includes at least 1 wt %, at least 2 wt %, or at least 5 wt % of $Na_2O$. In certain embodiments the optical glass includes at most 2 wt %, at most 1 wt % or at most 0.5 wt %. In other embodiments the optical glass may also be free from $Na_2O$.

The optical glass optionally includes 0 to 25 wt %, for example at most 20 wt %, at most 10 wt %, or at most 5 wt % of $K_2O$. In certain embodiments the optical glass includes at least 1 wt %, at least 2 wt %, or at least 5 wt % of $K_2O$. In certain embodiments the optical glass includes at most 2 wt %, at most 1 wt % or at most 0.5 wt % of $K_2O$. In certain embodiments the optical glass is free from $K_2O$.

The optical glass optionally includes 0 to 10 wt %, for example at most 5 wt %, at most 2 wt %, or at most 1 wt % of MgO. In certain embodiments the optical glass includes at least 0.5 wt %, at least 1 wt %, or at least 2 wt % of MgO. In certain embodiments the optical glass includes at most 0.5 wt %, at most 0.2 wt % or at most 0.1 wt % of MgO. In certain embodiments the optical glass is free from MgO.

The optical glass optionally includes 0 to 40 wt %, for example at most 30 wt %, at most 25 wt %, or at most 15 wt % of CaO. In certain embodiments the optical glass includes at least 1 wt %, at least 5 wt %, or at least 10 wt % of CaO. In certain embodiments the optical glass includes at most 10 wt %, at most 5 wt %, or at most 1 wt % of CaO. In certain embodiments the optical glass is free from CaO.

The optical glass optionally includes 0 to 25 wt %, as for example at most 15 wt %, at most 10 wt %, or at most 5 wt % of SrO. In certain embodiments the optical glass includes at least 0.5 wt %, at least 1 wt %, or at least 2 wt % of SrO. In certain embodiments the optical glass includes at most 2 wt %, at most 1 wt %, or at most 0.5 wt % of SrO. In certain embodiments the optical glass is free from SrO.

BaO on the one hand may stabilize high $TiO_2$ fractions in the glass, but on the other hand may adversely affect the refractive index. The optical glass optionally includes 0 to 55 wt %, for example at most 30 wt %, at most 20 wt %, or at most 10 wt % of BaO. In certain embodiments the optical glass includes at least 1 wt %, at least 5 wt %, or at least 10 wt % of BaO. In certain embodiments the optical glass includes at most 5 wt %, at most 2 wt %, or at most 1 wt % of BaO. In certain embodiments the optical glass is free from BaO.

The optical glass optionally includes 0 to 30 wt %, for example at most 20 wt %, at most 15 wt %, or at most 10 wt % of ZnO. In certain embodiments the optical glass includes at least 1 wt %, at least 2 wt %, or at least 5 wt % of ZnO. In certain embodiments the optical glass includes at most 5 wt %, at most 2 wt %, or at most 1 wt % of ZnO. In certain embodiments the optical glass is free from ZnO.

A high fraction of $La_2O_3$, $Gd_2O_3$, and $Y_2O_3$ is advantageous in order to attain a particularly high refractive index. However, the crystallization tendency may also increase, and so it may be advantageous to limit the amount.

The optical glass optionally includes 0 to 55 wt %, for example at most 50 wt %, at most 40 wt %, or at most 20 wt % of $La_2O_3$. In certain embodiments the optical glass includes at least 5 wt %, at least 10 wt %, or at least 20 wt % of $La_2O_3$. In certain embodiments the optical glass includes at most 10 wt %, at most 5 wt %, or at most 1 wt % of $La_2O_3$. In certain embodiments the optical glass is free from $La_2O_3$.

The optical glass optionally includes 0 to 20 wt %, for example at most 15 wt %, at most 10 wt %, or at most 5 wt % of $Gd_2O_3$. In certain embodiments the optical glass includes at least 1 wt %, at least 2 wt %, or at least 5 wt % of $Gd_2O_3$. In certain embodiments the optical glass includes at most 5 wt %, at most 2 wt %, or at most 1 wt % of $Gd_2O_3$. In certain embodiments the optical glass is free from $Gd_2O_3$.

The optical glass optionally includes 0 to 20 wt %, for example at most 15 wt %, at most 10 wt %, or at most 5 wt % of $Y_2O_3$. In certain embodiments the optical glass includes at least 0.1 wt %, at least 0.2 wt %, or at least 0.5 wt % of $Y_2O_3$. In certain embodiments the optical glass includes at most 2 wt %, at most 1 wt %, or at most 0.5 wt % of $Y_2O_3$. In certain embodiments the optical glass is free from $Y_2O_3$.

$TiO_2$ contributes to a high refractive index to a particular degree, and also helps to keep the density relatively low. A limitation on the fraction of $TiO_2$, however, is advantageous, since as a nucleating agent it may contribute to crystal growth, thereby making hot post-processing more difficult. The optical glass optionally includes 0 to 35 wt %, for example at most 30 wt %, at most 20 wt %, or at most 15 wt % of $TiO_2$. In certain embodiments the optical glass includes at least 2 wt %, at least 5 wt %, or at least 10 wt % of $TiO_2$. In certain embodiments the optical glass includes at most 10 wt %, at most 7.5 wt %, or at most 5 wt % of $TiO_2$. In certain embodiments the optical glass is free from $TiO_2$.

Unlike $TiO_2$, $ZrO_2$ does not tend to form relatively low colored oxidation states. However, there are limitations both to its solubility and to the rate at which $ZrO_2$ goes into solution. Relatively high fractions of $ZrO_2$ are unfavorable, since relatively high temperatures are required for complete dissolution, with adverse consequences in turn for the transmission. Moreover, the purity of $ZrO_2$ is not very high (there are contaminations with Fe in particular). The optical glass optionally includes 0 to 20 wt %, for example at most 15 wt %, at most 10 wt %, or at most 5 wt % of $ZrO_2$. In certain embodiments the optical glass includes at least 1 wt %, at least 2 wt %, or at least 5 wt % of $ZrO_2$. In certain embodiments the optical glass includes at most 7.5 wt %, at most 5 wt %, or at most 2.5 wt % of $ZrO_2$. In certain embodiments the optical glass is free from $ZrO_2$.

As well as its great influence on the refractive index, $Nb_2O_5$ also has positive consequences for the glass density. The densities can be lowered using this component. It may, however, tend toward oxygen loss and the formation of relatively low oxidation states, and hence to more intense coloration. The optical glass optionally includes 0 to 55 wt %, for example at most 35 wt %, at most 20 wt %, or at most 15 wt % of $Nb_2O_5$. In certain embodiments the optical glass includes at least 2 wt %, at least 5 wt %, or at least 10 wt % of $Nb_2O_5$. In certain embodiments the optical glass includes at most 10 wt %, at most 5 wt %, or at most 2 wt % of $Nb_2O_5$. In certain embodiments the optical glass is free from $Nb_2O_5$.

The optical glass optionally includes 0 to 10 wt %, for example at most 7.5 wt %, at most 5 wt %, or at most 2 wt % of $WO_3$. In certain embodiments the optical glass includes at least 0.1 wt %, at least 0.2 wt %, or at least 0.5 wt % of $WO_3$. In certain embodiments the optical glass includes at most 1 wt %, at most 0.5 wt %, or at most 0.2 wt % of $WO_3$. In certain embodiments the optical glass is free from $WO_3$.

The optical glass optionally includes 0 to 30 wt %, for example at most 25 wt %, at most 17.5 wt %, or at most 10 wt % of $Ta_2O_5$. In certain embodiments the optical glass includes at least 1 wt %, at least 2 wt %, or at least 5 wt % of $Ta_2O_5$. In certain embodiments the optical glass includes at most 5 wt %, at most 2 wt %, or at most 1 wt % of $Ta_2O_5$. In certain embodiments the optical glass is free from $Ta_2O_5$.

The optical glass optionally includes 0 to 20 wt %, for example at most 15 wt %, at most 10 wt %, or at most 5 wt % of $GeO_2$. In certain embodiments the optical glass includes at least 0.1 wt %, at least 0.5 wt %, or at least 1 wt % of $GeO_2$.

In certain embodiments the optical glass includes at most 2 wt %, at most 1 wt %, or at most 0.1 wt % of $GeO_2$.

The glass is optionally free from one or more of the constituents $WO_3$, $Ta_2O_5$ and/or $GeO_2$. Optionally the glass is free from $WO_3$, $Ta_2O_5$ and $GeO_2$. If these constituents are present, the batch costs increase considerably.

The optical glass optionally includes 0 to 65 wt %, for example at most 50 wt %, at most 20 wt %, or at most 10 wt % of $Bi_2O_3$. In certain embodiments the optical glass includes at least 1 wt %, at least 2 wt %, or at least 5 wt % of $Bi_2O_3$. In certain embodiments the optical glass includes at most 5 wt %, at most 1 wt %, or at most 0.1 wt % of $Bi_2O_3$. In certain embodiments the optical glass is free from $Bi_2O_3$.

The optical glass optionally includes 0 to 45 wt %, for example at most 25 wt %, at most 10 wt %, or at most 5 wt % of F. In certain embodiments the optical glass includes at least 0.1 wt %, at least 0.5 wt %, or at least 1 wt % of F. In certain embodiments the optical glass includes at most 2 wt %, at most 1 wt %, or at most 0.1 wt % of F. In certain embodiments the optical glass is free from F.

In certain embodiments the optical glass is free from $GeO_2$.

The optical glass optionally includes 0 to 80 wt %, for example at most 70 wt %, at most 50 wt %, or at most 20 wt % of PbO. In certain embodiments the optical glass includes at least 1 wt %, at least 2 wt %, or at least 5 wt % of PbO. In certain embodiments the optical glass includes at most 5 wt %, at most 1 wt %, or at most 0.1 wt % of PbO. In relation to toxicity and environmental harmfulness, in optional embodiments the optical glass is free from PbO.

The optical glasses may include $HfO_2$, especially in order to increase the refractive index. The fraction of $HfO_2$ is optionally in a range from 0 to 1 wt %, for example 0.1 to 0.5 wt % or 0.15 to 0.25 wt %. Low fractions of $HfO_2$ are generally unproblematic. Some embodiments, nevertheless, are free from $HfO_2$.

Optional optical glasses are glasses which include or consist of the following constituents (in wt % based on oxide):

| | |
|---|---|
| $SiO_2$ | 0-80 |
| $P_2O_5$ | 0-40 |
| $Al_2O_3$ | 0-25 |
| $B_2O_3$ | 0-55 |
| $Li_2O$ | 0-10 |
| $Na_2O$ | 0-25 |
| $K_2O$ | 0-25 |
| MgO | 0-10 |
| CaO | 0-30 |
| SrO | 0-25 |
| BaO | 0-55 |
| ZnO | 0-30 |
| $La_2O_3$ | 0-55 |
| $Gd_2O_3$ | 0-20 |
| $Y_2O_3$ | 0-20 |
| $ZrO_2$ | 0-20 |
| $TiO_2$ | 0-35 |
| $Ta_2O_5$ | 0-30 |

-continued

| | |
|---|---|
| $Nb_2O_5$ | 0-55 |
| $WO_3$ | 0-10 |
| $GeO_2$ | 0-20 |
| $Bi_2O_3$ | 0-65 |
| PbO | 0-80 |
| F | 0-45 |

Optional optical glasses are glasses which include or consist of the following constituents (in wt % based on oxide):

| | |
|---|---|
| $SiO_2$ | 0-80 |
| $P_2O_5$ | 0-30 |
| $Al_2O_3$ | 0-15 |
| $B_2O_3$ | 0-55 |
| $Li_2O$ | 0-10 |
| $Na_2O$ | 0-25 |
| $K_2O$ | 0-25 |
| MgO | 0-5 |
| CaO | 0-30 |
| SrO | 0-10 |
| BaO | 0-55 |
| ZnO | 0-30 |
| $La_2O_3$ | 0-55 |
| $Gd_2O_3$ | 0-20 |
| $Y_2O_3$ | 0-20 |
| $ZrO_2$ | 0-20 |
| $TiO_2$ | 0-35 |
| $Ta_2O_5$ | 0-30 |
| $Nb_2O_5$ | 0-55 |
| $WO_3$ | 0-10 |
| $GeO_2$ | substantially free from it |
| $Bi_2O_3$ | substantially free from it |
| PbO | 0-70 |
| F | 0-25 |

Optional optical glasses are glasses which include or consist of the following constituents (in wt % based on oxide):

| | |
|---|---|
| $SiO_2$ | 0-80 |
| $P_2O_5$ | 0-5 |
| $Al_2O_3$ | 0-10 |
| $B_2O_3$ | 0-45 |
| $Li_2O$ | 0-10 |
| $Na_2O$ | 0-20 |
| $K_2O$ | 0-20 |
| MgO | 0-5 |
| CaO | 0-30 |
| SrO | 0-10 |
| BaO | 0-55 |
| ZnO | 0-30 |
| $La_2O_3$ | 0-55 |
| $Gd_2O_3$ | 0-20 |
| $Y_2O_3$ | 0-20 |
| $ZrO_2$ | 0-20 |
| $TiO_2$ | 0-35 |
| $Ta_2O_5$ | 0-30 |
| $Nb_2O_5$ | 0-35 |
| $WO_3$ | 0-10 |
| $GeO_2$ | substantially free from it |
| $Bi_2O_3$ | substantially free from it |
| PbO | substantially free from it |
| F | 0-5 |

Optional optical glasses are glasses which include or consist of the following constituents (in wt % based on oxide):

| | |
|---|---|
| $SiO_2$ | 0-60 |
| $P_2O_5$ | 0-2 |

-continued

| | |
|---|---|
| $Al_2O_3$ | 0-5 |
| $B_2O_3$ | 0-45 |
| $Li_2O$ | 0-10 |
| $Na_2O$ | 0-10 |
| $K_2O$ | 0-10 |
| MgO | 0-5 |
| CaO | 0-30 |
| SrO | 0-10 |
| BaO | 0-30 |
| ZnO | 0-30 |
| $La_2O_3$ | 0-55 |
| $Gd_2O_3$ | 0-20 |
| $Y_2O_3$ | 0-20 |
| $ZrO_2$ | 0-15 |
| $TiO_2$ | 0-20 |
| $Ta_2O_5$ | 0-25 |
| $Nb_2O_5$ | 0-20 |
| $WO_3$ | 0-5 |
| $GeO_2$ | substantially free from it |
| $Bi_2O_3$ | substantially free from it |
| PbO | substantially free from it |
| F | substantially free from it |

Optional optical glasses are glasses which include or consist of the following constituents (in wt % based on oxide):

| | |
|---|---|
| $SiO_2$ | 0-15 |
| $P_2O_5$ | substantially free from it |
| $Al_2O_3$ | substantially free from it |
| $B_2O_3$ | 0-45 |
| $Li_2O$ | substantially free from it |
| $Na_2O$ | substantially free from it |
| $K_2O$ | substantially free from it |
| MgO | substantially free from it |
| CaO | 0-15 |
| SrO | 0-5 |
| BaO | 0-10 |
| ZnO | 0-30 |
| $La_2O_3$ | 0-55 |
| $Gd_2O_3$ | 0-20 |
| $Y_2O_3$ | 0-20 |
| $ZrO_2$ | 0-10 |
| $TiO_2$ | 0-15 |
| $Ta_2O_5$ | 0-10 |
| $Nb_2O_5$ | 0-15 |
| $WO_3$ | 0-5 |
| $GeO_2$ | substantially free from it |
| $Bi_2O_3$ | substantially free from it |
| PbO | substantially free from it |
| F | substantially free from it |

The glasses may include refining agents, such as SnO and/or $Sb_2O_3$ and/or $As_2O_3$, for example, in small amounts, in amounts for example of in each case less than 0.5 wt %, less than 0.1 wt % or less than 0.05 wt %.

The above glass compositions may optionally include additions of coloring oxides, such as $Nd_2O_3$, $Fe_2O_3$, CoO, NiO, $V_2O_5$, $MnO_2$, CuO, $CeO_2$, $Cr_2O_3$, and/or rare earth oxides, for example, in amounts of—in each case individual or in total—0-15 wt %. Optional variants are free from coloring oxides. Optional optical glasses are free more particularly from $Fe_2O_3$.

The fraction of platinum is optionally especially low, since platinum lowers the transmission of the optical glass to a particular degree. The fraction of platinum is optionally less than 5 ppm, optionally less than 3 ppm, optionally less than 1 ppm, optionally less than 50 ppb, optionally less than 20 ppb.

Particularly optional optical glasses are substantially free from PbO and/or CdO.

In accordance with the invention the expression "substantially free from" or "free from a component X" means, respectively, that the optical glass essentially does not contain this component X, in other words that such a component is present at most as an impurity in the glass, but is not added as an individual component to the composition. In relation to an impurity, a limit of 0.03 wt %, optionally 0.01 wt %, ought not to be exceeded, based on an individual component in each case.

Particularly suitable optical glasses are described for example in DE 10 2021 110 497.1, DE 10 2020 120 171.0, EP 1437215 A1, DE 10 2009 010 701 A1, DE 10 2006 013 599 A1 and DE 10 2013 225 061 A1. The contents and the subjects of the latter publications are hereby incorporated by reference in full into the subject matter of the present invention.

In a further, likewise optional embodiment, the multicomponent glass is a glass-ceramic.

Glass-ceramics in the sense of the present invention refer, accordingly, to a multicomponent glass which consists of a polycrystalline phase and a glassy phase. On account of their low thermal expansion behavior they may be especially suitable for particular applications.

Particularly suitable glass-ceramics are zero-expansion LAS glass-ceramics, as described for example in DE 10 2018 111 144 A1 and WO 2015/124710 A1. The contents and subjects of the latter publications are hereby incorporated by reference in full into the subject matter of the present invention.

In a yet further, likewise optional embodiment, the multicomponent glass is an optical ceramic.

In the context of the present invention, the term "optical ceramic" denotes a substantially single-phase, polycrystalline, oxide-based material of high transparency. Optical ceramics are to be understood accordingly as a special subgroup of the ceramics. Suitable optical ceramics and their production methods are apparent, for example, from the applicant's publications DE 10 2009 055 987 A1, DE 10 2006 027 958 A1 or EP 2 246 317 A1, which are hereby incorporated by reference in full and rendered part of the subject matter of the present application.

The substrate here may have a refractive index $n_d$, based on a wavelength of 587.6 nm, in a range from 1.45 to 2.45. The refractive index $n_d$ may optionally be situated, furthermore, in a range from 1.50 to 2.40, optionally in a range from 1.55 to 2.35, optionally in a range from 1.60 to 2.30, optionally in a range from 1.65 to 2.25, optionally in a range from 1.70 to 2.20.

Moreover, according to one optional embodiment, the substrate may have an internal transmission of at least 80%, more particularly at least 85% or at least 90%, optionally at least 95%, measured at a wavelength of 450 nm and a sample thickness of 10 mm.

The internal transmission or internal transmissivity may be measured by techniques familiar to the skilled person, in accordance, for example, with DIN 5036-1:1978. In the present description, the information regarding the internal transmission is based on a wavelength of 450 nm and a sample thickness of 10 mm. The indication of a "sample thickness" does not mean that the substrate has this thickness, instead merely indicating the thickness on which the internal transmission datum is based. Unless otherwise indicated or apparent to the skilled person, measurements described herein are carried out at 20° C. and 101.3 kPa air pressure.

Furthermore, according to another optional embodiment, the substrate may be distinguished by a high mechanical resistance or high hardness. The substrate according to the invention optionally has a Knoop hardness $H_k$ of 2 GPa to 10

GPa, optionally of 2.5 GPa to 9.5 GPa, optionally of 3 GPa to 9 GPa, optionally of 3.5 GPa to 8.5 GPa, optionally of 4 to 8 GPa.

This Knoop hardness $H_k$ is a hardness test known to the skilled person and can be determined according to DIN ISO 9385, optionally for a penetration force of 0.9807 N (i.e., 0.1 kp) and a penetration time of 20 seconds.

The optical and mechanical properties stated above for the substrate are valid both for the substrate in the original state and for the modified regions or substrates modified accordingly.

In contrast to methods for the working of silicon wafers, for example, the method of the invention advantageously enables the working of hard, transparent and/or high-index substrates composed of glass, glass-ceramic or optical ceramic.

The substrates accordingly may include, for example, diffractive optical elements, with the method of the invention enabling the modification of at least of regions of the surface or portions.

In certain embodiments the substrates may also include wafers, examples being glass wafers, glass-ceramic wafers or optical-ceramic wafers.

Wafers of these kinds composed of high-transparency, high-index glass, glass-ceramic or optical ceramic may be used very effectively for, for example, imaging optical systems in the field of augmented reality (AR).

The substrate in this context may refer to the wafer as a whole, or else only to a component separated off from a wafer, such as, for example, a component which has been separated off—or singulated—from a glass wafer and is intended for eyepieces, i.e., for oculars, in the field of augmented reality.

For the method of the present invention, it may be the case that glass is first melted from suitable raw materials in accordance with one of the above-stated compositions in a glass-melting facility, and is subsequently cast into bars or blocks.

Before the providing and the modifying, the substrate may be separated off from this monolithic bar or block.

Depending on the material selected for the substrate, other production methods are also conceivable and possible—for example, the downdraw method, the overflow fusion method, redrawing, or else floating. In the case of optical ceramics it is also possible, for example, to provide a monocrystalline block, also referred to as an ingot.

The separation here may include at least one of the following machining steps:

- drilling an oversize cylinder from the bar or block;
- separating off the substrates from the cylinder;
- grinding the edges to the desired wafer diameter;
- introducing faceting of the edges;
- applying a positional mark;
- optionally fine-working at least one surface of the substrate.

Separation from the cylinder may be accomplished by sawing, using wire saws, for example, with typically an oversize being provided likewise in the thickness.

The fine working of at least one of the surfaces may be accomplished in one or more refinement steps, including precision polishing or lapping, in order to attain the corresponding properties and to bring the substrate as close as possible to the required specifications. Also contemplated in this context is the complete omission of fine working after separation. This has the advantage that the substrate does not need to come into contact with polishing agent if, following singulation, there is only modifying by way of a particle beam.

The application of a positional mark, such as a notch or score, for example, may facilitate subsequent ongoing processing of the substrate, when, for example, further components are to be divided off from a substrate. The positional mark enables utility regions to be specified in relation to the positional mark or to an orientation point on or in the substrate, even in the case of rotationally symmetric substrates. The marking may be applied in or on the substrate by way of a laser beam, for example.

Utility regions can therefore be defined for subsequent separation of parts from the substrate, and this may increase the yield, for instance. It is also possible to omit subsequent measurements, in the case of an operator carrying out further processing of the substrates, for instance, in order to identify potential utility regions, if the substrate is individualized, together with the positional mark, with storage of information regarding the utility regions. A utility region of the substrate is interpreted, accordingly, as referring to those regions of the substrates from which individual components can be or are to be separated off in subsequent processing operations.

According to optional embodiments the substrate may have a thickness of between 0.2 mm and 2 mm, optionally between 0.3 mm and 1 mm, also optionally between 0.4 mm and 0.75 mm. The thickness of the substrate here is optionally smaller than the lateral extent of the substrate. The lateral extent, in the case of large-format substrates, for instance, may be greater by a factor of 10 or even of 100 or more than the thickness of the substrate.

Where separated components are to be modified, this component, an eyepiece for example, may already have the desired outer contour. This outer contour may encompass any desired geometrical shape, examples being linear or curved portions or else corners, including, in particular, nonregular outer contours. Such parts may possess comparatively small dimensions, in a range, for example, starting from about 2 mm×2 mm, with the maximum size being determined by the apparatus for generating a particle beam.

In one particularly optional embodiment the substrate is rotationally symmetrical, in which case the diameter may be between 0.7 cm and 50 cm, optionally 3 cm to 45 cm. The diameter of the substrate in this case may correspond, for example, to the diameter of a 2-inch wafer or 50.8 mm, 3-inch wafer or 76.2 mm, 4-inch wafer or 100 mm, 5-inch wafer or 125 mm, 6-inch wafer or 150 mm, 8-inch wafer or 200 mm, 12-inch wafer or 300 mm, or 18-inch wafer or 450 mm.

In general it will be favorable, by way of the working steps identified above, to bring the substrate as closely as possible to the desired specification at this stage, in order to minimize the cost and complexity of the modifying according to the invention.

Hence, for planned uses of the substrate in the field of augmented reality, for example, it may be favorable if for the substrate or for the surfaces delimiting the substrate in a lateral direction, at least one of the following properties or characteristics is fulfilled:

Total Thickness Variation (TTV): <=10 μm;
Local Slope: <=1 arcmin;
Warp: <=100 μm;
Bow: −100 μm<=Bow<=100 μm;
Roughness: $R_q$<=10 μm.

These properties refer accordingly to the substrate or the surfaces of the substrate prior to modifying in accordance with the invention. Optionally, therefore, these are the surfaces or regions which are to be modified in accordance with the invention.

The properties and characteristics of substrates as stated above are known to the skilled person from the field of silicon wafer production and the intention at this point, therefore, is to provide only a brief classification of them:

Hence the term "Total Thickness Variation" (TTV) refers to the difference between the maximum and minimum thicknesses of the substrate.

The term "Local Slope" here means the slopes in the thickness distribution of the substrates. These slopes may be ascertained or defined as overall or local slopes on the basis of cross sections through the thickness distributions or else as directed slopes (in x- or y-direction, for example) or maximum slopes (gradients) of the extensive thickness distributions.

The thickness distribution is measured generally at discrete locations (pixels) which are dictated by the local spatial resolution of the measurement method used. Slopes are therefore approximated as ratios of differences between the individual measurement points, with a minimum base width corresponding to the spatial resolution. The measurement signals for the pixels, however, may have a noise component. By amalgamating a plurality of pixels it is possible to reduce this noise, but with an accompanying increase in the base width of the slope determination.

It may therefore also be advantageous to approximate the local thickness distributions by adaptation of linear or extensive polynomial developments, such as Zernike polynomials, for example, and from these approximations to obtain a numerical determination of the slope distributions directly.

For base widths which are small relative to the substrate size, i.e., typically <3 mm, the term "Local Slope" is generally introduced. For larger regions of the substrate, more particularly for regions in the order of magnitude of portions, the term "Local Wedge" is also used for differentiation, and is typically ascertained from a polynomial approximation. A "Wedge", conversely, is understood to be the slope of an adaptation face (e.g., as a first-order Zernike polynomial) to the thickness distribution of the quality face of the overall substrate.

The warp and the bow are characteristics which are used to express the shape of a wafer which is lying flat and therefore is not, for example, being held by a chuck. The substrate, accordingly, is mounted without forces or is lying on a flat base. The center surface in the thickness direction of the substrate acts here as the measurement plane, with the best-fitting plane for the measurement plane being adopted as a reference plane. The warp represents the maximum value of the displacement from the reference plane to the measurement plane. The bow represents the difference between the reference plane and the measurement plane at the center of the substrate. If the substrate is mounted using a locally confined support, as in the case, for example, of a three-point mounting or fork mount in the marginal region, there is additional bending under the influence of forces of gravity, which is referred to as sagging. The extent of this bending is therefore dependent substantially on the geometrical disposition of the support. Moreover, the mechanical properties of the material and the geometric shape of the substrate are parameters which determine the sagging.

The roughness $R_q$ refers to the quadratic roughness, also referred to as RMS (root mean squared).

The roughness measurements can be carried out by way of white light interferometry or AFM technologies.

The characteristics stated above have emerged as being favorable for the modifying, although it is of course also possible to modify substrates which deviate therefrom in one or more characteristics.

The substrate may be characterized in the lateral direction by a first surface and a second, opposite surface, and these two surfaces may be planar. It is, however, also possible for at least one surface to be concave or convex.

The specific surface contour is not the governing factor for the modifying, since, for example, even inclined surfaces can be modified to the surface through corresponding adjustment of the angle of impingement of the particle beam. This itself is a major advantage of the invention.

A surface and/or a portion of a substrate may be modified for various purposes.

Hence, in one aspect of the invention, the intention through modifying a surface and/or a portion of the substrate is to remove material from the surface, in order, in the region thus modified, to reduce the thickness and/or to improve the surface quality and/or to attain compliance with characteristics in accordance with the mandated specification.

For this purpose, the surface or a region of the surface or a portion of the substrate is exposed to the particle beam, with the exposure enabling atomization and ablation of material from the surface. This operation is also referred to as polishing or "Trimming".

In this way the thickness of the substrate can be reduced.

It is, however, also possible to improve one or all of the aforementioned characteristics of the substrate, embracing the Total Thickness Variation, the Local Slope, the Warp, the Bow and/or the Roughness.

On the basis of the above-stated manifestations of the characteristics, therefore, it is possible to provide a substrate which includes at least one modified region, and where at least one of the following characteristics is fulfilled for at least the modified region:

Total Thickness Variation (TTV): <=1 μm or <=0.75 μm or <=0.5 μm, optionally <=0.4 μm, more optionally <=0.3 μm, or even <=0.2 μm;

Local Slope: <=0.3 arcmin, <=0.16 arcmin, optionally <=0.13 arcmin, more optionally <=0.10 arcmin;

Warp: <=100 μm, optionally <=70 μm, more optionally <=50 μm;

Bow: −50 μm<=Bow<=50 μm;

Roughness: $R_q$<=1 μm, optionally <=100 nm, more optionally <=10 nm.

The area of the modified region in this case may be very small—for example, about 2 mm×2 mm. It may, however, of course also be much larger or else may include the entire surface of the substrate. The above-stated characteristics may be based, for example, on a rotationally symmetric substrate with the size of a 6-inch wafer or an 8-inch wafer, and thus on a substrate having a diameter of 150 mm or 200 mm.

For example, then, according to one embodiment of the invention, the entire surface of the substrate can be modified, in order to reduce the overall thickness, or in order to ablate residues of polishing agent and restore the original optical properties of the substrate.

This may be very advantageous, since residues of polishing agent can penetrate into the substrate surface and in some circumstances can alter the optical properties, in terms of the refractive index, for instance. In the field of augmented reality applications in particular, however, even very small deviations in refractive index may result in altered optical properties in subsequent use, and in instances of distortion, for example.

The substrate here may include two planar or approximately planar or parallel or approximately parallel surfaces. At least one surface may alternatively be convex or concave. The surfaces, however, may of course also have other topologies.

Through the modifying it is possible, for example, to reduce an existing thickness difference, as for example by 1%, by 5%, or by 10%, by 20% or even more, such as by 30%, for example. This may be useful when the precision polishing as part of the production of the substrate has introduced an unwanted thickness distribution, with the marginal regions, for example, having been ablated to a greater extent than regions of the substrate near the center, and the intention is to produce a maximum uniformity of thickness. The invention therefore enables the adaptation of the thickness distribution of the substrate to a mandated, specified form. Through the modifying of a surface, accordingly, it is possible to adapt slopes or curvatures in the thickness distribution of the substrate, for example.

In another embodiment of the invention, however, the intention may also be to impress a particular topology, i.e., a particular distribution form of the thickness, onto the thickness distribution of the substrate by the modifying of a substrate surface, or by the same modifying to achieve a deliberate alteration of an existing thickness distribution or topology.

For this purpose, the method of the invention additionally and advantageously includes the measuring of the substrate or of the thickness distribution of the substrate prior to the modifying, in order to ascertain the desired characteristics.

The characteristics obtained can be calibrated against the required specifications, and, from the deviation or difference in the measured characteristics relative to the required characteristics, target mandates can be ascertained for the modifying and can be transmitted to the controller of the apparatus for generating a particle beam. In this way, for example, the profile of the thickness distribution of the substrate can be measured prior to the modifying and compared with a target profile.

It is possible for this purpose to utilize methods of interferometry, examples being interferometers, on the basis, for instance, of planar wavefronts with a fixed wavelength (e.g., HeNe lasers) or in a narrowly confined wavelength range. Measuring facilities based on the interferometry of planar wavefronts, for example, can be used, such as those available from Zygo, for example, and which offer advantages particularly in conjunction with transparent substrates made of glass, glass-ceramic or optical ceramic.

The method of the invention, particularly in connection with the positional mark of the substrate and with the measurement, affords a further major advantage. Hence, on the basis of the measured characteristics and of a comparison with required specifications, it is possible to ascertain and specify accordingly the possible utility regions on the substrate. Where, for example, individual components, for subsequent use as eyepieces, for instance, are to be separated off from the substrate, the yield can be optimized by identifying those utility regions of the substrate that come closest to the eyepiece specification. In this way, the number of components obtainable from a substrate can be optimized, and/or those regions or portions of the substrate which are subsequently modified in accordance with the invention can be specified in a targeted way.

In one development of the invention, therefore, the intention is to apply not only a positional mark on the substrates but also, supplementarily or additionally, an identity mark, enabling unambiguous identification of the particular substrate. This may be done, for example, as part of the production of the substrates and the introduction of the positional mark.

Alternatively, and in a particularly favorable way, it may also be accomplished by introducing such an identity mark, enabling unambiguous identification of the particular substrate, at a location on the substrate through the modifying of the surface in accordance with the invention.

On the one hand this makes it possible to forgo the cost and inconvenience of modifying, since prior to the modifying it is possible to deliberately select and specify those regions on the surface of the substrate that are to be processed. On the other hand, the yield can also be boosted through the possibility of optimizing the number and size of components to be separated per substrate, as a function of the characteristics ascertained.

In one embodiment of the invention, prior to the modifying, provision may be made for a supporting layer to be applied at least to those regions of the surface that are to be modified, or at least to the portion of the substrate that is to be modified, in order to avoid possible discharges of the surface. This layer may be a carbon layer or graphite layer, for example.

The present invention also provides for the modifying to include the production of a microgroove or microgap on the surface of the substrate. This microgroove or microgap may serve as preparation for a later parting, such as in order to separate eyepiece components from the substrate.

The present invention also provides for the modifying to include the working of an edge of a substrate. In this case, material can be ablated from the edge of the substrate, in regions, for example, in which there are microcracks. The microcracks can enlarge, under mechanical loads, for instance, and can lead to uncontrolled breaking of the substrate. The invention enables the working of edges such that, through ablation of material, the microcracks are ablated as well and an edge is produced which is free or virtually free from microcracks. Given that the microcracks are generally fairly small, ablation in an order of magnitude of just a few 100 μm may significantly increase the fracture resistance.

In one development of the invention, the intention is to guide the particle beam not only perpendicularly to the surface or the edge, but instead at an angle. In this way the edge as well can be formed in a predetermined angle.

An angle can also be achieved by exposing regions of the edge to the particle beam for different lengths of time or a different number of times.

It is also possible to alter the transition from surface to the side wall of the substrate in accordance with a desired topology by the modifying, in order, for example, to produce a rounding or a rounded edge.

The present invention also provides that the modifying includes the structuring or the introduction of a grating or pattern on at least one region of the surface of the substrate with the particle beam. The grating here may be very fine in form, with depths and widths of the trenches produced in a range of a few micrometers, for instance.

As is evident to the skilled person, the above-stated embodiments of the modifying of a surface and/or of a portion of a substrate may also be combined with one another.

Hence it is possible first of all, for example, to specify the utility regions on the surface of the substrate and to modify these regions of the substrate surface in order to comply there with the required specifications. An identity mark can then be introduced. Lastly, in a further procedure, the microgrooves can be introduced in preparation for later singulation. The invention affords the major advantage that there is no need for this purpose to take the substrate out of the apparatus.

This not only reduces the time involved, but may also lead to better quality, as the substrates can react very sensitively to impacts or mechanical effects, and, moreover, removal also carries with it the risk of the substrate being exposed to temperature changes, which especially in the case of very thin substrates can result in unwanted deformation. If the substrate then has to be inserted again and mounted in an apparatus for a further operating step, this process itself may mean that it is no longer possible to comply with specifications.

In one development of the invention, in the method, a layer may be applied prior to the modifying, optionally a protective layer, such as a photoresist layer or masking layer, for example, in which case regions of the surface or portions of the substrate that are not to be modified may be covered.

Embraced by the invention as well, in a further aspect of the invention, is a substrate, the substrate including a multicomponent glass, and the substrate being produced or producible with a method for modifying at least regions of a surface as set out above.

The substrate may fulfill the manifestations set out above, in terms, for instance, of the material, the optical properties or the geometrical dimensions.

The substrate may further include at least one modified region which fulfills at least one of the following characteristics:

Total Thickness Variation (TTV): <=1 μm or <=0.75 μm or <=0.5 μm, optionally <=0.4 μm, more optionally <=0.3 μm, or even <=0.2 μm;

Local Slope: <=0.3 arcmin, <=0.16 arcmin, optionally <=0.13 arcmin, more optionally <=0.10 arcmin;

Warp: <=100 μm, optionally <=70 μm, more optionally <=50 μm;

Bow: −50 μm<=Bow<=50 μm;

Roughness: $R_q$<=1 μm, optionally <=100 nm, more optionally <=10 nm.

At least one of these characteristics may also be valid for the entire surface or the entire substrate, if, for example, a surface is modified in its entirety.

Where only a region of a surface is modified, accordingly, the substrate may possess at least one further, second region which is unmodified and which may fulfill at least one of the following characteristics:

Total Thickness Variation (TTV): <=10 μm;

Local Slope: <=1 arcmin;

Warp: <=100 μm;

Bow: −100 μm<=Bow<=100 μm;

Roughness: $R_q$<=10 μm.

In further aspect the invention relates to a substrate, the substrate including a multicomponent glass, optionally produced or producible by the method of the invention for modifying at least regions of a surface as set out above, where the substrate includes at least one modified region which possesses a near-surface marginal region having a depth of up to 500 nm, optionally of at least 40 nm to 400 nm, this near-surface marginal region being free or largely free from accumulation of cerium oxide.

In one particularly optional embodiment this near-surface marginal region of up to 500 nm, optionally of at least 40 nm to 400 nm, is also free or largely free from accumulations of potassium.

This means that for cerium oxide and/or potassium, the concentration in this near-surface marginal region corresponds to the concentration in the bulk and is optionally not substantially increased.

In a further aspect the invention relates to a substrate, the substrate including a multicomponent glass, optionally produced or producible by the method of the invention for modifying at least regions of a surface as set out above, including at least one modified region which may possess a directed arrangement of fine grooves in the nanometer or subnanometer depth range. These grooves may have a length of a few micrometers and be ascertained by way of AFM measurements. This may distinguish modified regions of the substrate from other surfaces of other substrates, such as, for example, unmodified surfaces or surfaces of substrates which have been polished by way of known methods of fine working. As a result of polishing or lapping methods, for instance, fine grooves of nanometer or subnanometer depth range of this kind may be formed, having an irregular arrangement, in other words being present with a random distribution over the corresponding region.

In a further aspect the invention relates to a substrate, the substrate including a multicomponent glass, optionally produced or producible by the method of the invention for modifying at least regions of a surface as set out above, including fewer than 100, optionally fewer than 50, optionally fewer than 20, optionally fewer than 10, optionally fewer than 5 and with further option fewer than 2 scratches in a region of 2 μm x 2 μm, where a scratch has a length in the range from 100 nm to 15 000 nm, optionally from 250 nm to 10 000 nm, optionally 300 to 5000 nm, and with further option 400 to 2800 nm;

a depth of 0.5 to 100 nm, optionally 1-50 nm, optionally 10-25 nm; and a width of 0.5 to 50 nm, optionally 1 to 25 nm, and with further option 2 to 10 nm.

The scratches in the sense of the invention may be ascertained by way of AFM measurements for example.

In connection with the substrate of the invention, the optional embodiments stated in connection with the substrate produced in accordance with the invention are valid correspondingly.

In yet a further aspect the invention relates to the use of a substrate as described above, more particularly for applications in the field of augmented reality, examples being imaging optical systems, or as a cover for microelectronic systems, for example sensors, cameras.

The particle-beam modifying of at least one region of a surface and/or portion of a substrate in accordance with the invention may also be used for modifying or polishing high-quality wafers, carrier wafers or patterned wafers for applications including wafer level packaging (WLP), including 3D-IC ("three-dimensional integrated circuit"), RF-IC ("radiofrequency integrated circuit") or camera imaging applications, wafer level optics, pressure sensor packaging, laser diode packaging, camera imaging packaging, wafer level optics packaging or LED packaging, fan-out wafer level packaging (FOWLP), back-grinding applications (lapping and polishing of silicon wafers) or, generally, applications involving very stringent requirements with regard to the geometric properties such as TTV, bow, warp or roughness of the wafers.

Further details of the present invention are apparent from the description of the exemplary embodiments portrayed and the appended claims.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplification set out herein illustrate at least one embodiment of the invention, and such exemplifications are not to be construed as limiting the scope of the invention in any manner.

DETAILED DESCRIPTION OF THE INVENTION

In the detailed description below of optional embodiments, identical reference symbols for the sake of clarity designate substantially identical parts in or on these embodiments. For better illustration of the present invention, however, the optional embodiments represented in the figures are not always drawn to scale.

Figure 1:
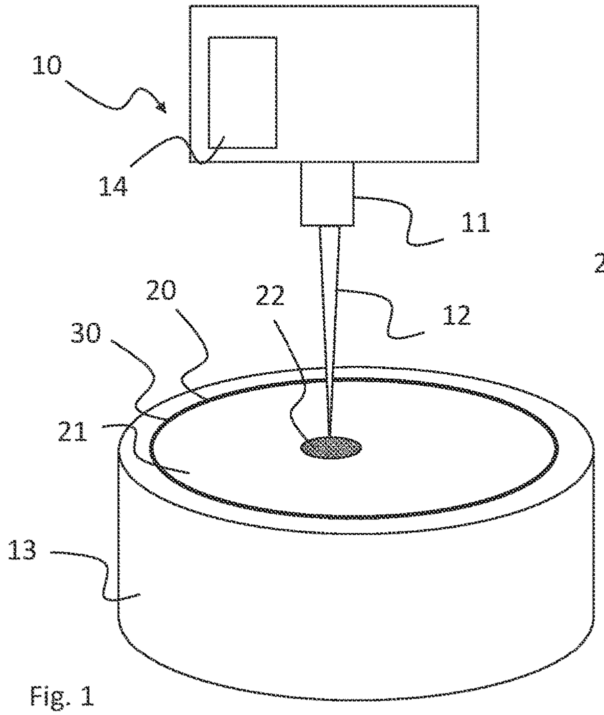
FIG. 1 shows schematically an arrangement of an apparatus having a radiation source for generating a particle beam in an oblique view, and a substrate.

FIG. 1 shows schematically an arrangement of an apparatus 10 having a radiation source 11 for generating a particle beam 12 in an oblique view, and a substrate 20.

The apparatus 10 is designed for implementing a method for modifying at least a region of a surface and/or a portion of the substrate 20, the substrate 20 including a multicomponent glass. Drawn on a purely illustrative basis in FIG. 1 is a modified region 22 on a surface 21 of the substrate 20. Additionally drawn purely schematically in FIG. 1 is an accommodation facility or mount 13 for accommodating and/or mounting the substrate 20.

The apparatus 10 includes an ion source as radiation source 11, which is used to generate ions. In the exemplary embodiment the assumption is made that these are positively charged ions, more particularly of argon. The particle beam 12 is directed as a focused ion beam in operation onto the substrate 20 mounted in the apparatus 10, and a vacuum is applied, optionally a high vacuum. A corresponding chamber (not represented) is provided for this purpose. In the operation of the apparatus 10, the ions are accelerated in the direction onto the substrate 20. On impingement on the surface 21 of the substrate 20 being worked, there is a transfer of impulse from the ions to the substrate 20, and material is atomized and ablated from the surface 21 by exposure to the particle beam 12. As a result of this, a region of the surface 21 and/or a portion of the substrate 20 are/is modified by exposure to the particle beam 12, and a modified region 22 is produced.

The particle beam 12 may be guided over a region or portion of the substrate 20 by way of corresponding deflection units (not represented), in order to modify that region or portion accordingly. The deflection units are equipped such that any desired point on the substrate 20 can be reached.

The apparatus 10 includes suitable computer-assisted devices 14 for controlling the particle beam, allowing the particle beam 12 to be guided over the substrate 20 according to mandatable programs or parameters. This may also take place more than once, in order to ablate more material, for instance or to ablate material to a different depth. The controlling of the particle beam 12 here may relate not only to the guiding of the particle beam 12 over the substrate 20, but also, instead, to the setting of performance parameters of the particle beam, examples being the intensity, the duration, the focusing, or the angle at which the particle beam 12 impinges on the substrate 20 at the corresponding point.

The substrate 20 here includes a multicomponent glass. This means that the substrate 20 includes at least oxides of at least two different cations.

In the case of the embodiment depicted, the multicomponent glass is an optical glass. Optical glass in the sense of the invention refers to glasses suitable for optical applications, especially optical crown glasses and flint glasses. These may be selected from the group encompassing silicon-, boron-, aluminum-, phosphorus-, fluorine-, lanthanum-, titanium-, barium- and/or niobium-containing crown or flint glasses.

Particularly suitable glasses for the substrate 20 are glasses which include the following constituents (in wt % based on oxide):

| Constituent | Amount (wt %) |
|---|---|
| $SiO_2$ | 0-80 |
| $P_2O_5$ | 0-40 |
| $Al_2O_3$ | 0-25 |
| $B_2O_3$ | 0-55 |
| $Li_2O$ | 0-10 |
| $Na_2O$ | 0-25 |
| $K_2O$ | 0-25 |
| MgO | 0-10 |
| CaO | 0-30 |
| SrO | 0-25 |
| BaO | 0-55 |
| ZnO | 0-30 |
| $La_2O_3$ | 0-55 |
| $Gd_2O_3$ | 0-20 |
| $Y_2O_3$ | 0-20 |
| $ZrO_2$ | 0-20 |
| $TiO_2$ | 0-35 |
| $Ta_2O_5$ | 0-30 |
| $Nb_2O_5$ | 0-55 |
| $WO_3$ | 0-10 |
| $GeO_2$ | 0-20 |
| $Bi_2O_3$ | 0-65 |
| PbO | 0-80 |
| F | 0-45 |

Optional optical glasses for the substrate 20 are glasses which include or consist of the following constituents (in wt % based on oxide):

| | |
|---|---|
| $SiO_2$ | 0-80 |
| $P_2O_5$ | 0-30 |
| $Al_2O_3$ | 0-15 |
| $B_2O_3$ | 0-55 |
| $Li_2O$ | 0-10 |
| $Na_2O$ | 0-25 |
| $K_2O$ | 0-25 |
| MgO | 0-5 |
| CaO | 0-30 |
| SrO | 0-10 |
| BaO | 0-55 |
| ZnO | 0-30 |
| $La_2O_3$ | 0-55 |
| $Gd_2O_3$ | 0-20 |
| $Y_2O_3$ | 0-20 |
| $ZrO_2$ | 0-20 |
| $TiO_2$ | 0-35 |
| $Ta_2O_5$ | 0-30 |
| $Nb_2O_5$ | 0-55 |
| $WO_3$ | 0-10 |
| $GeO_2$ | substantially free from it |
| $Bi_2O_3$ | substantially free from it |

-continued

| | |
|---|---|
| PbO | 0-70 |
| F | 0-25 |

Optional optical glasses for the substrate 20 are glasses which include or consist of the following constituents (in wt % based on oxide):

| | |
|---|---|
| $SiO_2$ | 0-80 |
| $P_2O_5$ | 0-5 |
| $Al_2O_3$ | 0-10 |
| $B_2O_3$ | 0-45 |
| $Li_2O$ | 0-10 |
| $Na_2O$ | 0-20 |
| $K_2O$ | 0-20 |
| MgO | 0-5 |
| CaO | 0-30 |
| SrO | 0-10 |
| BaO | 0-55 |
| ZnO | 0-30 |
| $La_2O_3$ | 0-55 |
| $Gd_2O_3$ | 0-20 |
| $Y_2O_3$ | 0-20 |
| $ZrO_2$ | 0-20 |
| $TiO_2$ | 0-35 |
| $Ta_2O_5$ | 0-30 |
| $Nb_2O_5$ | 0-35 |
| $WO_3$ | 0-10 |
| $GeO_2$ | substantially free from it |
| $Bi_2O_3$ | substantially free from it |
| PbO | substantially free from it |
| F | 0-5 |

Optional optical glasses for the substrate 20 are glasses which include or consist of the following constituents (in wt % based on oxide):

| | |
|---|---|
| $SiO_2$ | 0-60 |
| $P_2O_5$ | 0-2 |
| $Al_2O_3$ | 0-5 |
| $B_2O_3$ | 0-45 |
| $Li_2O$ | 0-10 |
| $Na_2O$ | 0-10 |
| $K_2O$ | 0-10 |
| MgO | 0-5 |
| CaO | 0-30 |
| SrO | 0-10 |
| BaO | 0-30 |
| ZnO | 0-30 |
| $La_2O_3$ | 0-55 |
| $Gd_2O_3$ | 0-20 |
| $Y_2O_3$ | 0-20 |
| $ZrO_2$ | 0-15 |
| $TiO_2$ | 0-20 |
| $Ta_2O_5$ | 0-25 |
| $Nb_2O_5$ | 0-20 |
| $WO_3$ | 0-5 |
| $GeO_2$ | substantially free from it |
| $Bi_2O_3$ | substantially free from it |
| PbO | substantially free from it |
| F | substantially free from it |

Optional optical glasses for the substrate 20 are glasses which include or consist of the following constituents (in wt % based on oxide):

| | |
|---|---|
| $SiO_2$ | 0-15 |
| $P_2O_5$ | substantially free from it |
| $Al_2O_3$ | substantially free from it |
| $B_2O_3$ | 0-45 |
| $Li_2O$ | substantially free from it |
| $Na_2O$ | substantially free from it |
| $K_2O$ | substantially free from it |
| MgO | substantially free from it |
| CaO | 0-15 |
| SrO | 0-5 |
| BaO | 0-10 |
| ZnO | 0-30 |
| $La_2O_3$ | 0-55 |
| $Gd_2O_3$ | 0-20 |
| $Y_2O_3$ | 0-20 |
| $ZrO_2$ | 0-10 |
| $TiO_2$ | 0-15 |
| $Ta_2O_5$ | 0-10 |
| $Nb_2O_5$ | 0-15 |
| $WO_3$ | 0-5 |
| $GeO_2$ | substantially free from it |
| $Bi_2O_3$ | substantially free from it |
| PbO | substantially free from it |
| F | substantially free from it |

The glasses may include refining agents, such as $Sb_2O_3$ and/or $As_2O_3$, for example, in small amounts, in amounts for example of in each case less than 0.1 wt %, less than 0.03 wt % or less than 0.01 wt %.

The above glass compositions may optionally include additions of coloring oxides, such as $Nd_2O_3$, $Fe_2O_3$, CoO, NiO, $V_2O_5$, $MnO_2$, CuO, $CeO_2$, $Cr_2O_3$, and/or rare earth oxides, for example, in amounts of—in each case individual or in total—0-15 wt %. Optional variants are free from coloring oxides. Particularly optional optical glasses of the substrate 20 are free from $Fe_2O_3$.

The fraction of platinum is optionally especially low, since platinum lowers the transmission of the optical glass to a particular degree. The fraction of platinum is optionally less than 5 ppm, optionally less than 3 ppm, optionally less than 1 ppm, optionally less than 50 ppb, optionally less than 20 ppb.

In a further, likewise optional embodiment, the multicomponent glass of the substrate 20 is a glass-ceramic. Representing a particularly suitable material for the substrate 20 are zero-expansion LAS glass-ceramics, such as, for example, the glass-ceramic material ZERODUR® from Schott AG, Mainz, Germany.

In a yet further, likewise optional embodiment, the multicomponent glass is an optical ceramic.

The substrate 20 here has a refractive index $n_d$, based on a wavelength of 587.6 nm, in a range from 1.45 to 2.45. The refractive index $n_d$ may optionally be situated, furthermore, in a range from 1.50 to 2.40, optionally in a range from 1.55 to 2.35, optionally in a range from 1.60 to 2.30, optionally in a range from 1.65 to 2.25, optionally in a range from 1.70 to 2.20.

Moreover, according to one optional embodiment, the substrate 20 has an internal transmission of at least 80%, more particularly at least 85% or at least 90%, very optionally at least 95%, measured at a wavelength of 450 nm and a sample thickness of 10 mm.

Furthermore, according to another optional embodiment, the substrate 20 is distinguished by a high mechanical resistance or high hardness. The substrate 20 according to the invention optionally has a Knoop hardness $H_k$ of 2 GPa to 10 GPa, optionally of 2.5 GPa to 9.5 GPa, optionally of 3 GPa to 9 GPa, optionally of 3.5 GPa to 8.5 GPa, optionally of 4 to 8 GPa.

The optical and mechanical properties stated above for the substrate 20 are valid both for the substrate in the original state and for the modified regions 22 or substrates 20 modified accordingly.

In contrast to methods for the working of silicon wafers, for example, the method of the invention advantageously enables the working of hard, transparent and/or high-index substrates composed of glass, glass-ceramic or optical ceramic.

In the exemplary embodiment the substrate 20 includes a diffractive optical element, with the method of the invention enabling the modification at least of regions of the surface or portions.

In certain embodiments the substrates 20 may also include wafers, examples being glass wafers, glass-ceramic wafers or optical-ceramic wafers. In the exemplary embodiment of FIG. 1, the substrate 20 is a glass wafer 30 having a composition as elucidated above.

Wafers of these kinds composed of high-transparency, high-index glass, glass-ceramic or optical ceramic may be used very effectively for—for example—imaging optical systems in the field of augmented reality (AR).

Figure 3:
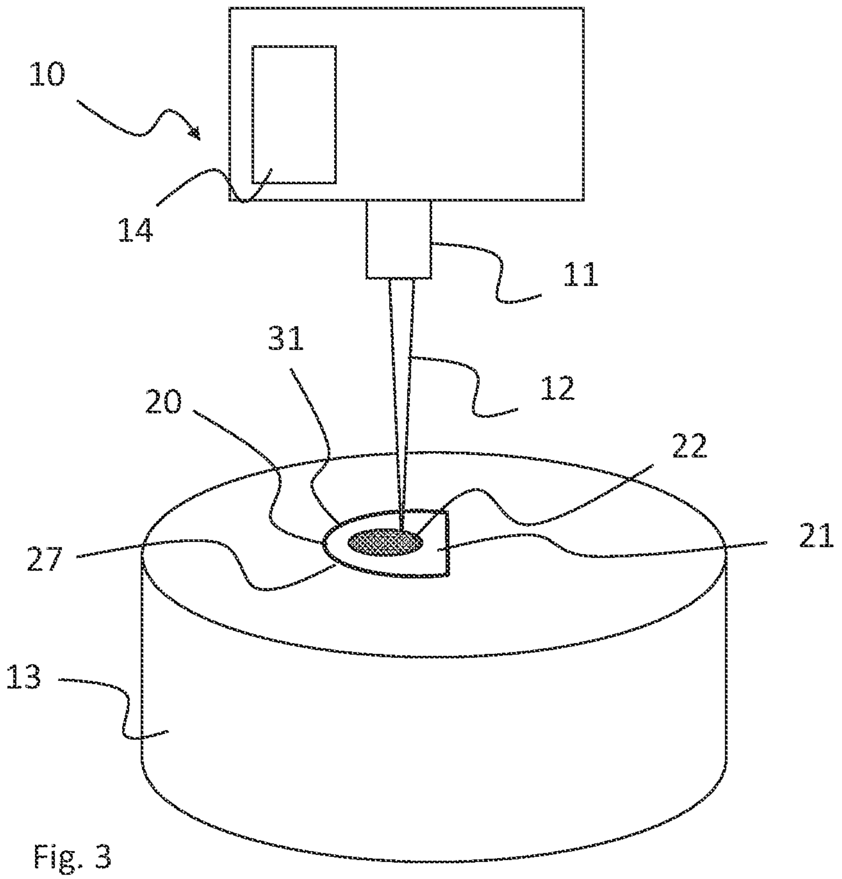
FIG. 3 shows schematically an arrangement of an apparatus having a radiation source for generating a particle beam in an oblique view, and a further substrate.

FIG. 3 shows a further exemplary embodiment, wherein the substrate 20 includes a component 31 separated from a glass wafer 30, or singulated. This component 31 may be used, for example, for eyepieces, i.e., for oculars in the field of augmented reality. The component 31 may accordingly have the same composition or include the same material as a wafer.

The glass wafer 30 is separated from a monolithic bar or block including optical glass. For this purpose, raw materials in accordance with one of the compositions stated above can be melted in a glass-melting facility and, in the form of molten glass, cast into bars or blocks.

Depending on the material selected for the substrate 20, other production methods are also conceivable and possible—for example, the downdraw method, the overflow fusion method, redrawing, or else floating. In the case of optical ceramics it is also possible, for example, to provide a monocrystalline block, also referred to as an ingot.

Subsequently the following machining steps may be performed:

- drilling an oversize cylinder from the bar or block;
- separating off the substrates 20 from the cylinder;
- grinding the edges to the desired wafer diameter;
- introducing faceting of the edges;
- applying a positional mark 24;
- optionally fine-working at least one surface of the substrate 20.

Separation from the cylinder may be accomplished by sawing, using wire saws, for example, with typically an oversize being provided likewise in the thickness.

The fine working of at least one of the surfaces 21 may be accomplished in one or more refinement steps, including precision polishing or lapping, in order to attain the corresponding properties and to bring the substrate 20 as close as possible to the required specifications.

In another embodiment no fine-working is carried out after the separating. This has the advantage that the substrate 20 does not need to come into contact with polishing agent if, following singulation, there is only modifying by way of a particle beam.

The application of a positional mark 24, such as a notch or score, for example, may facilitate subsequent ongoing processing of the substrate 20, when, for example, further components are to be divided off from a substrate 20. The positional mark 24 enables utility regions 23 to be specified in relation to the positional mark 24 or to an orientation point on or in the substrate, even in the case of rotationally symmetric substrates 20. The marking may be applied in or on the substrate 20 by way of a laser beam, for example.

Utility regions 23 can therefore be defined for subsequent separation of parts such as, for example, the component 31 from the substrate 20, and this may increase the yield, for instance.

Figure 2:
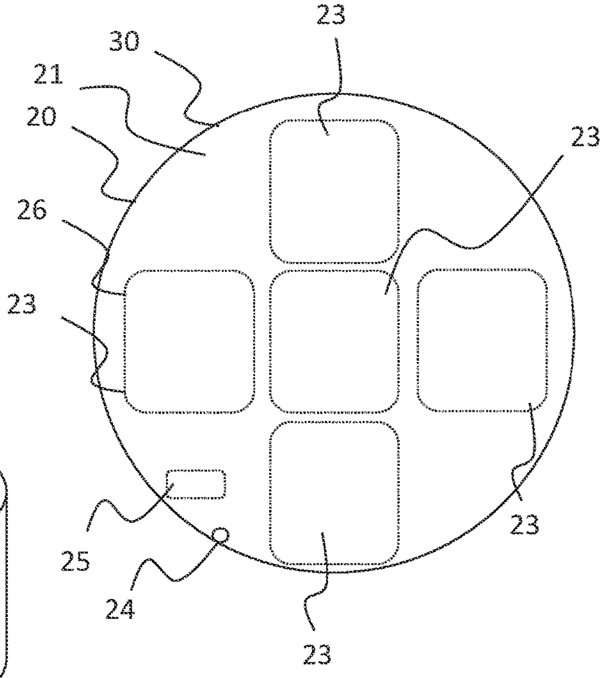
FIG. 2 shows schematically a substrate in a plan view.

FIG. 2 shows schematically a substrate 20, in this example a glass wafer 30, in a plan view. As well as the positional mark 24 there are a total of 5 utility regions 23 drawn in, which can be used for the later separation of parts such as, for example, the component 31.

Presently it is also possible to forgo subsequent measurements, on the part of an operator carrying out further processing of the substrates, for instance, since the utility regions 23 are identified by measurements and specified and together with the positional mark 24 there is an individualization of the substrate 20 with recording of information about the utility regions 23. This information relates, for instance, to the specific position and extent of the utility regions 23 in relation to the positional mark 24.

For this purpose, as well as the positional mark 24, the substrate 20 has an identity mark 25, which enables unambiguous identification of the respective substrate. The identity mark 25 enables unambiguous identification of the respective substrate 20.

The substrate 20 has a thickness of between 0.2 mm and 2 mm, optionally between 0.3 mm and 1 mm, also optionally between 0.4 mm and 0.75 mm. The thickness of the substrate 20 in this case is smaller than the lateral extent of the substrate 20.

Where separated components 31 are to be modified, this component 31, for example an eyepiece or a precursor of an eyepiece, may already have the desired outer contour. The outer contour in this case may encompass any desired geometrical shape, examples being linear or curved portions or else corners, including, in particular, irregular outer contours. Such components 31 may possess comparatively small dimensions, in a range, for example, starting from about 2 mm×2 mm, with the minimum and maximum sizes being limited by the apparatus 10 and the accommodation facilities or mounts 13.

In the embodiment of FIGS. 1 and 2, the substrate 20 is rotationally symmetrical, in which case the diameter may be between 0.7 cm and 50 cm, optionally 3 cm to 45 cm. The diameter of the substrate 20 in this case may correspond, for example, to the diameter of a 2-inch wafer or 50.8 mm, 3-inch wafer or 76.2 mm, 4-inch wafer or 100 mm, 5-inch wafer or 125 mm, 6-inch wafer or 150 mm, 8-inch wafer or 200 mm, 12-inch wafer or 300 mm, or 18-inch wafer or 450 mm.

The substrate 20 in the exemplary embodiment is provided as a glass wafer 30 for uses in the field of augmented reality. For this purpose, for the substrate 20 or for the surfaces 21 delimiting the substrate 20 in a lateral direction, at least one of the following properties or characteristics is fulfilled:

- Total Thickness Variation (TTV): <=10 μm;
- Local Slope: <=1 arcmin;
- Warp: <=100 μm;
- Bow: −100 μm<=Bow<=100 μm;
- Roughness: $R_q$<=10 μm.

These properties refer accordingly to the substrate 20 or to surfaces 21 of the substrate 20 prior to modifying in accordance with the invention. The above-stated characteristics have proven to be favorable for the modifying, although of course substrates 20 may also be modified that deviate from this in one or more characteristics.

The substrate 20 is characterized in a lateral direction by a first surface 21 and a second, opposite surface, with these two surfaces 21 being parallel to one another in the exemplary embodiment. It is, however, also possible for at least one surface 21 to be concave or convex. In principle other topologies of the surface 21 are also possible and conceivable. This itself is a major advantage of the invention.

A surface 21 and/or a portion of a substrate 20 may be modified for various purposes.

Hence, in one aspect of the invention, the intention through modifying a surface 21 and/or a portion of the substrate 20 is to remove material from the surface, in order, in the region thus modified, to reduce the thickness and/or to improve the surface quality and/or to attain compliance with characteristics in accordance with the mandated specification.

For this purpose, the surface 21 or a region of the surface 21 or a portion of the substrate is exposed to the particle beam, with the exposure enabling atomization and ablation of material from the surface. This operation is also referred to as polishing or "Trimming". In FIG. 1, a modified region 22 is represented purely for the purpose of illustration.

The thickness of the substrate 20 can be reduced in the modified region 22 in this way, and/or the surface quality can be improved. It is, however, also possible to improve one or all of the aforementioned characteristics of the substrate 20, embracing the Total Thickness Variation, the Local Slope, the Warp, the Bow and/or the Roughness.

On the basis of the above-stated manifestations of the characteristics, therefore, it is possible to provide a substrate 20 which includes at least one modified region 22, and where at least one of the following characteristics is fulfilled for at least the modified region 22:

Total Thickness Variation (TTV): <=1 μm or <=0.75 μm or <=0.5 μm, optionally <=0.4 μm, more optionally <=0.3 μm, or even <=0.2 μm;

Local Slope: <=0.3 arcmin, <=0.16 arcmin, optionally <=0.13 arcmin, more optionally <=0.10 arcmin;

Warp: <=100 μm, optionally <=70 μm, more optionally <=50 μm;

Bow: −50 μm<=Bow<=50 μm;

Roughness: $R_q$<=1 μm, optionally <=100 nm, more optionally <=10 nm.

The area of the modified region in this case may be very small—for example, about 2 mm×2 mm. It may, however, of course also be much larger or else may include the entire surface 21 of the substrate 20. The above-stated characteristics may be based, for example, on a rotationally symmetric substrate 20 with the size of a 6-inch wafer as depicted or of an 8-inch wafer.

For example, then, according to one embodiment of the invention, the entire surface 21 of the substrate can be modified, in order to reduce the overall thickness, or in order to ablate residues of polishing agent and restore the original optical properties of the substrate 20.

This may be very advantageous, since residues of polishing agent can penetrate into the surface 21 of the substrate 20 and in some circumstances can alter the optical properties, in terms of the refractive index, for instance. In the field of augmented reality applications in particular, however, even very small deviations in refractive index may result in altered optical properties in subsequent use, and in instances of distortion, for example.

The substrate 20 in the exemplary embodiment includes two planar or approximately planar surfaces 21. At least one surface 21 may alternatively be convex or concave. The surfaces, however, may of course also have other topologies.

Through the modifying it is possible, for example, to reduce an existing thickness difference, as for example by 1%, by 5%, or by 10%, by 20% or even more, such as by 30%, for example. This may be useful when the precision polishing as part of the production of the substrate has introduced an unwanted thickness distribution, with the marginal regions, for example, having been ablated to a greater extent than regions of the substrate 20 near the center, and the intention is to produce a maximum uniformity of thickness of the surfaces 21.

In a further embodiment of the invention, however, it is also possible to impress a particular distribution on the thickness distribution of the substrate 20 by the modifying, or to alter an existing thickness distribution.

For this purpose, the method of the invention additionally and advantageously includes the measuring of the substrate 20 or of the thickness distribution, or the profile of the thickness distribution, of the substrate 20 prior to the modifying, in order to ascertain the desired characteristics.

The characteristics obtained can be calibrated against the required specifications, and, from the deviation or difference in the measured characteristics relative to the required characteristics, target mandates can be ascertained for the modifying and can be transmitted to the controller 14 of the apparatus 10 for generating a particle beam 12. In this way, for example, the thickness distribution of the substrate 20 can be measured prior to the modifying and compared with a target profile.

The method of the invention, particularly in connection with the positional mark 24 of the substrate 20 and with the measurement, affords a further major advantage. Hence, on the basis of the measured characteristics and of a comparison with required specifications, it is possible to ascertain and specify accordingly the possible utility regions 23 on the substrate. Where, for example, individual components 31, for subsequent use as eyepieces, for instance, are to be separated off from the substrate, the yield can be optimized by identifying those utility regions 23 of the substrate 20 that come closest to the eyepiece specification. In this way, the number of components 31 obtainable from a substrate 20 can be optimized, and/or those regions or portions of the substrate which are subsequently modified in accordance with the invention can be specified in a targeted way.

On the one hand this makes it possible to forgo the cost and inconvenience of modifying, since prior to the modifying it is possible to deliberately select and specify those regions on the surface 21 of the substrate 20 that are to be processed. On the other hand, the yield can also be boosted through the possibility of optimizing the number and size of components to be separated per substrate, as a function of the characteristics ascertained.

In one embodiment of the invention, prior to the modifying, provision may be made for a supporting layer to be applied at least to those regions of the surface 21 that are to be modified, or at least to the portion of the substrate 20 that is to be modified, in order to avoid possible discharges of the surface. This layer may be a carbon layer or graphite layer, for example.

The present invention also provides for the modifying to include the production of a microgroove or microgap on the surface of the substrate. This microgroove or microgap may serve as preparation for a later parting, such as in order to separate eyepiece components from the substrate. This microgap 26 may be introduced, for example, along the delimitation, represented by dashes, of the utility regions 23 on the surface 21 of the substrate 20, by way of modifying in accordance with the invention.

The present invention also provides for the modifying to include the working of an edge 27 of a substrate 20. In this case, material can be ablated from the edge 27 of the substrate 20, in regions in which there are microcracks. The microcracks can enlarge, under mechanical loads, for instance, and can lead to uncontrolled breaking of the substrate. The invention enables the working of edges such that, through ablation of material, the microcracks are ablated as well and an edge 27 is produced which is free or virtually free from microcracks. Given that the microcracks are generally fairly small, ablation in an order of magnitude of just a few 100 μm may significantly increase the fracture resistance.

In one development of the invention, the intention is to guide the particle beam 12 not only perpendicularly to the surface or the edge, but instead at an angle. In this way the edge as well can be formed in a predetermined angle.

An angle can also be achieved by exposing regions of the edge 27 to the particle beam 12 for different lengths of time or a different number of times.

It is also possible to alter the transition from surface to the side wall of the substrate in accordance with a desired topology by the modifying, in order, for example, to produce a rounding or a rounded edge.

The present invention also provides that the modifying includes the structuring or the introduction of a grating or pattern on at least one region of the surface of the substrate with the particle beam. The grating here may be very fine in form, with depths and widths of the trenches produced in a range of a few micrometers, for instance.

As is evident to the skilled person, the above-stated embodiments of the modifying of a surface and/or of a portion of a substrate may also be combined with one another.

Hence it is possible first of all, for example, to specify the utility regions 23 on the surface 21 of the substrate 20 and to modify these regions of the substrate 20 surface 21 in order to comply there with the required specifications. An identity mark 25 can then be introduced. Lastly, in a further procedure, the microgrooves 26 can be introduced in preparation for later singulation. The invention affords the major advantage that there is no need for this purpose to take the substrate 20 out of the apparatus 10.

This not only reduces the time involved, but may also lead to better quality, as the substrates 20 can react very sensitively to impacts or mechanical effects, and, moreover, removal also carries with it the risk of the substrate 20 being exposed to temperature changes, which especially in the case of very thin substrates can result in unwanted deformation. If the substrate 20 then has to be inserted again and mounted in an apparatus for a further operating step, this process itself may mean that it is no longer possible to comply with specifications.

In one development of the invention, in the method, a layer may be applied prior to the modifying, optionally a protective layer, such as a photoresist layer or masking layer, for example, in which case regions of the surface or portions of the substrate that are not to be modified may be covered.

Embraced by the invention as well, in a further aspect of the invention, is a substrate 20, the substrate 20 including a multicomponent glass, and the substrate being produced or producible with a method for modifying at least regions of a surface as set out above.

A substrate 20 modified in accordance with the invention here satisfies the manifestations set out above, in terms of the material, the optical properties, and the geometrical dimensions.

A substrate 20 modified in accordance with the invention here includes at least one modified region 22 which fulfills at least one of the following characteristics:

Total Thickness Variation (TTV): <=1 μm or <=0.75 μm or <=0.5 μm, optionally <=0.4 μm, more optionally <=0.3 μm, or even <=0.2 μm;

Local Slope: <=0.3 arcmin, <=0.16 arcmin, optionally <=0.13 arcmin, more optionally <=0.10 arcmin;

Warp: <=100 μm, optionally <=70 μm, more optionally <=50 μm;

Bow: −50 μm<=Bow<=50 μm;

Roughness: $R_q$<=1 μm, optionally <=100 nm, more optionally <=10 nm.

At least one of these characteristics may also be valid for the entire surface 21 or the entire substrate 20, if, for example, a surface 21 is modified in its entirety.

Where only a region of a surface 21 is modified, accordingly, the substrate 20 may possess at least one further, second region which is unmodified and which may fulfill at least one of the following characteristics:

Total Thickness Variation (TTV): <=10 μm;

Local Slope: <=1 arcmin;

Warp: <=100 μm;

Bow: −100 μm<=Bow<=100 μm;

Roughness: $R_q$<=10 μM.

The substrate 20 of the invention includes at least one modified region 22 which possesses a near-surface marginal region having a depth of up to 500 nm, optionally of at least 40 nm to 400 nm, this near-surface marginal region being free or largely free from accumulation of cerium oxide.

In one optional embodiment this near-surface marginal region having a depth of up to 500 nm, optionally of at least 40 nm to 400 nm, is also free or largely free from accumulations of potassium.

This means that for cerium oxide and/or potassium, the concentration in this near-surface marginal region corresponds to the concentration in the bulk and is not increased.

The substrate 20 of the invention may further include at least one modified region which may possess a directed arrangement of fine grooves in the nanometer or subnanometer depth range. These grooves may have a length of a few micrometers and be ascertained by way of AFM measurements. This may distinguish modified regions 22 of the substrate 20 from other surfaces of other substrates, such as, for example, unmodified surfaces or surfaces of substrates which have been polished by way of known methods of fine working. As a result of lapping methods, for instance, fine grooves of nanometer or subnanometer depth range of this kind may be formed, having an irregular arrangement, in other words being present with a random distribution over the corresponding region.

In accordance with the invention a substrate 20 may be provided, the substrate 20 including a multicomponent glass, having at least one surface 22 modified at least regionally or in portions, which has fewer than 100, optionally fewer than 50, optionally fewer than 20, optionally fewer than 10, optionally fewer than 5 and with further option fewer than 2 scratches in a region of 2 μm x 2 μm, where a scratch has:

a length in the range from 100 nm to 15 000 nm, optionally from 250 nm to 10 000 nm, optionally 300 to 5000 nm, and with further option 400 to 2800 nm;

a depth of 0.5 to 100 nm, optionally 1-50 nm, optionally 10-25 nm; and a width of 0.5 to 50 nm, optionally 1 to 25 nm, and with further option 2 to 10 nm.

In yet a further aspect the invention relates to the use of a substrate as described above, more particularly for applications in the field of augmented reality, examples being imaging optical systems, or as a cover for microelectronic systems, for example sensors, cameras.

The particle-beam modifying of at least one region of a surface and/or portion of a substrate in accordance with the invention may also be used for modifying or polishing high-quality wafers, carrier wafers or patterned wafers for applications including wafer level packaging (WLP), including 3D-IC ("three-dimensional integrated circuit"), RF-IC ("radiofrequency integrated circuit") or camera imaging applications, wafer level optics, pressure sensor packaging, laser diode packaging, camera imaging packaging, wafer level optics packaging or LED packaging, fan-out wafer level packaging (FOWLP), back-grinding applications (lapping and polishing of silicon wafers) or, generally, applications involving very stringent requirements with regard to the geometric properties such as TTV, bow, warp or roughness of the wafers.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for physically modifying at least one of at least one region of a surface of a substrate and at least one portion of the substrate, the substrate comprising a multi-component glass, the method comprising the steps of:

providing an apparatus and the substrate, the apparatus including a radiation source configured for generated a particle beam;

feeding the substrate to the apparatus and applying a vacuum;

modifying at least one of the at least one region of the surface of the substrate and the at least one portion of the substrate by an exposure to the particle beam with the result that the substrate includes at least one modified region which has a Total Thickness Variation (TTV) of <=1 μm, the method further including measuring a thickness distribution or a thickness profile of the substrate before the step of modifying in order to obtain a plurality of specifications for the step of modifying.

2. The method according to claim 1, wherein the substrate comprises a plurality of oxides of at least two different cations, the substrate being an optical glass, an optical ceramic, or a glass-ceramic.

3. The method according to claim 2, wherein the substrate comprises at least one optical crown glass or at least one optical flint glass, selected from the group including at least one of silicon-, boron-, aluminum-, phosphorus-, fluorine-, lanthanum-, titanium-, barium- and niobium-containing crown or flint glasses.

4. The method according to claim 3, wherein the substrate comprises at least one of the following constituents (in wt % based on oxide):

| Constituent | Amount (wt %) |
|---|---|
| $SiO_2$ | 0-80 |
| $P_2O_5$ | 0-40 |
| $Al_2O_3$ | 0-25 |
| $B_2O_3$ | 0-55 |
| $Li_2O$ | 0-10 |
| $Na_2O$ | 0-25 |
| $K_2O$ | 0-25 |
| MgO | 0-10 |
| CaO | 0-30 |
| SrO | 0-25 |
| BaO | 0-55 |
| ZnO | 0-30 |
| $La_2O_3$ | 0-55 |
| $Gd_2O_3$ | 0-20 |
| $Y_2O_3$ | 0-20 |
| $ZrO_2$ | 0-20 |
| $TiO_2$ | 0-35 |
| $Ta_2O_5$ | 0-30 |
| $Nb_2O_5$ | 0-55 |
| $WO_3$ | 0-10 |
| $GeO_2$ | 0-20 |
| $Bi_2O_3$ | 0-65 |
| PbO | 0-80 |
| F | 0-45. |

5. The method according to claim 1, wherein a refractive index $n_d$ of the substrate, based on a wavelength of 587.6 nm, is in a range from 1.45 to 2.45.

6. The method according to claim 1, wherein the substrate has an internal transmission of at least 80%, wavelength of 450 nm and a sample thickness of 10 mm.

7. The method according to claim 1, wherein before the step of providing, the substrate is separated off from a monolithic bar or block, the method further comprising the steps of:

drilling a cylinder from the monolithic bar or block;

separating off the substrate from the cylinder;

grinding a plurality of edges of the substrate to a desired wafer diameter;

introducing faceting of the plurality of edges;

applying a positional mark;

fine-working at least one surface of the substrate.

8. The method according to claim 1, wherein the substrate has a thickness of between 0.2 mm and 2 mm, the thicknessof the substrate being smaller than a lateral extent of the substrate.

9. The method according to claim 1, wherein the substrate is rotationally symmetrical and has a diameter which is between 0.7 cm and 50 cm, and corresponds to a diameter of a 2-inch wafer or a 50.8 mm wafer, a 3-inch wafer or a 76.2 mm wafer, a 4-inch wafer or a 100 mm wafer, a 5-inch wafer or a 125 mm wafer, a 6-inch wafer or a 150 mm wafer, a 8-inch wafer or a 200 mm wafer, a 12-inch wafer or a 300 mm wafer, or an 18-inch wafer or a 450 mm wafer.

10. The method according to claim 1, wherein the substrate or a plurality of surfaces delimiting the substrate in a lateral direction fulfill at least one of the following characteristics:

Total Thickness Variation (TTV): <=10 μm;

Local Slope: <=1 arcmin;

Warp: <=100 μm;

Bow: −100 μm<=Bow<=100 μm;

Roughness: $R_q$<=10 μm.

11. The method according to claim 1, wherein the substrate comprises a first surface and a second surface opposite thereto, (a) the first surface and the second surface being planar in a respective portion thereof or (b) at least one of the first surface and the second surface being concave in a respective portion thereof or convex in a respective portion thereof.

12. The method according to claim 1, wherein the step of modifying comprises polishing the at least one region of the surface of the substrate or an entire surface of the substrate with the particle beam, the exposure to the particle beam causing an atomization and an ablation of a material from the surface.

13. The method according to claim 12, wherein the substrate comprises at least one modified region which fulfills at least one of the following characteristics:

Local Slope: <=0.3 arcmin;

Warp: <=100 μm;

Bow: −50 μm<=Bow<=50 μm;

Roughness: $R_q$<=1 μm.

14. The method according to claim 1, wherein the step of modifying at least one of:

reduces an existing thickness difference; and creates a predetermined thickness distribution.

15. The method according to claim 1, wherein measuring takes place by way of at least one method of interferometry or by way of an interferometry of a plurality of planar wavefronts.

16. The method according to claim 1, wherein, before the step of modifying, a supporting layer is applied at least to a plurality of the region of the surface of the substrate or the at least one portion of the substrate that is/are to be modified, the supporting layer being a carbon layer or a graphite layer.

17. The method according to claim 1, wherein the step of modifying comprises generating a microgroove or microgap for subsequent parting.

18. The method according to claim 1, wherein the step of modifying comprises working an edge of the substrate.

19. The method according to claim 1, wherein the step of modifying comprises structuring or introducing a grating or a pattern on the at least one region of the surface of the substrate with the particle beam.

20. The method according to claim 19, wherein the particle beam is a focused ion beam, which, for the step of modifying, is guided by way of a plurality of deflection units over the at least one region of the surface of the substrate or the at least one portion of the substrate.

21. A substrate, comprising:

a multicomponent glass, which is produced or configured for being produced by a method for physically modifying at least one of at least one region of a surface of the substrate and at least one portion of the substrate, the method comprising the steps of:

providing an apparatus and the substrate, the apparatus including a radiation source configured for generating a particle beam;

feeding the substrate to the apparatus and applying a vacuum;

modifying at least one of the at least one region of the surface of the substrate and the at least one portion of the substrate by an exposure to the particle beam with the result that the substrate includes at least one modified region which has a Total Thickness Variation (TTV) of <=1 μm, the method further including measuring a thickness distribution or a thickness profile of the substrate before the step of modifying in order to obtain a plurality of specifications for the step of modifying.

22. The substrate according to claim 21, wherein at least one surface of the substrate possesses a near-surface marginal region having a depth of up to 500 nm, the near-surface marginal region being free or largely free of an accumulation of cerium oxide or potassium.

23. The substrate according to claim 21, wherein at least one surface of the substrate has fewer than 100 scratches in a region of 2 μm×2 μm, with a respective one of the scratches having:

a length in a range from 100 nm to 15,000 nm;

a depth of 0.5 to 100 nm; and a width of 0.5 to 50 nm.

24. A method of using a substrate, the method comprising the steps of:

providing that the substrate includes a multicomponent glass, wherein the multicomponent glass is produced or configured for being produced by a method for physically modifying at least one of at least one region of a surface of the substrate and at least one portion of the substrate, the method for physically modifying comprising the steps of:

providing an apparatus and the substrate, the apparatus including a radiation source configured for generating a particle beam;

feeding the substrate to the apparatus and applying a vacuum;

modifying at least one of the at least one region of the surface of the substrate and the at least one portion of the substrate by an exposure to the particle beam with the result that the substrate includes at least one modified region which has a Total Thickness Variation (TTV) of <=1 μm, the method further including measuring a thickness distribution or a thickness profile of the substrate before the step of modifying in order to obtain a plurality of specifications for the step of modifying; and using the substrate for at least one application in a field of augmented reality.

* * * * *